(12) United States Patent
Nonaka et al.

(10) Patent No.: US 7,162,151 B2
(45) Date of Patent: Jan. 9, 2007

(54) CAMERA

(75) Inventors: Osamu Nonaka, Sagamihara (JP); Yuji Imai, Hachioji (JP)

(73) Assignee: Olympus Corporation, Tokyo (JP)

( * ) Notice: Subject to any disclaimer, the term of this patent is extended or adjusted under 35 U.S.C. 154(b) by 156 days.

(21) Appl. No.: 10/911,396

(22) Filed: Aug. 4, 2004

(65) Prior Publication Data

US 2005/0057660 A1    Mar. 17, 2005

(30) Foreign Application Priority Data

Aug. 8, 2003   (JP)   ............................ 2003-290180
Aug. 8, 2003   (JP)   ............................ 2003-290181

(51) Int. Cl.
*G03B 17/00* (2006.01)
(52) U.S. Cl. .................................... 396/52; 348/208.15
(58) Field of Classification Search ............ 396/52–53; 348/208.99, 208.6, 208.7, 208.15
See application file for complete search history.

(56) References Cited

U.S. PATENT DOCUMENTS

| | | | | |
|---|---|---|---|---|
| 4,862,277 A | * | 8/1989 | Iwaibana | ................ 348/208.15 |
| 5,030,984 A | * | 7/1991 | Buckler et al. | ............. 396/153 |
| 5,687,399 A | | 11/1997 | Kai et al. | |

2003/0067544 A1* 4/2003 Wada ....................... 348/208.7

FOREIGN PATENT DOCUMENTS

| | | |
|---|---|---|
| JP | 5-022649 | 1/1993 |
| JP | 6-046322 | 2/1994 |
| JP | 6-118492 | 4/1994 |
| JP | 6-250272 | 9/1994 |
| JP | 8-223471 | 8/1996 |
| JP | 11-225284 | 8/1999 |
| JP | 2002-290816 | 10/2002 |

* cited by examiner

*Primary Examiner*—W. B. Perkey
(74) *Attorney, Agent, or Firm*—Straub & Pokotylo; John C. Pokotylo

(57) ABSTRACT

A camera comprises an optical photographing system, an image pickup device which receives a luminous flux via the optical photographing system to output image data, a monitor on which an image is displayed based on the image data, an actuator which controls a position of the image pickup device to obtain the image data in which an influence of camera shake is reduced, and a camera shake detecting section which detects a camera shake state. In the camera, the image data at the time of non-operation of the actuator is processed/formed from the image data obtained at this time and the camera shake state detected by the camera shake detecting section, and a control is executed in such a manner that the image data at the time of the non-operation of the actuator and the image data at the time of operation of the actuator are displayed on the monitor.

35 Claims, 13 Drawing Sheets

CAMERA

CROSS-REFERENCE TO RELATED APPLICATIONS

This application is based upon and claims the benefit of priority from prior Japanese Patent Applications No. 2003-290180, filed Aug. 8, 2003; and No. 2003-290181, filed Aug. 8, 2003, the entire contents of both of which are incorporated herein by reference.

BACKGROUND OF THE INVENTION

1. Field of the Invention

The present invention relates to a camera, particularly to a camera which has a function of preventing camera shake.

2. Description of the Related Art

In general, camera shake in a camera is easily generated, when a focal distance of a photographing lens is longer, or when a shutter speed is reduced to lengthen an exposure time. Various cameras having camera shake correction functions of preventing the camera shakes have been proposed.

For example, a camera which drives a part of an optical photographing system to prevent the camera shake has been proposed in Jpn. Pat. Appln. KOKAI Publication Nos. 6-118492, 6-250272 and the like.

Moreover, a technique in which the camera shake correcting section is disposed on the side of a camera main body, not on the side of the optical photographing system has been proposed, for example, in Jpn. Pat. Appln. KOKAI Publication Nos. 8-223471, 5-22649 and the like. This is a technique in which the image pickup device is moved within a plane crossing an optical photographing axis at right angles to correct the camera shake.

Furthermore, as proposed in Jpn. Pat. Appln. KOKAI Publication No. 6-46322, a subject is not observed by the optical finder system, but the subject is observed by an electric view finder (EVF).

BRIEF SUMMARY OF THE INVENTION

According to an aspect of the present invention there is provided a camera comprising: an optical photographing system; an image pickup device which receives a luminous flux via the optical photographing system to output image data; a monitor on which an image is displayed based on the image data obtained by the image pickup device; a camera shake correcting section which controls a position of the image pickup device or processes the image data from the image pickup device to obtain the image data in which an influence of camera shake is reduced; a camera shake detecting section which detects a camera shake state of the camera; a processing/forming section which forms the image data at the time of non-operation of the camera shake correcting section based on the image data which is obtained by operation of the camera shake correcting section and in which the influence of the camera shake is reduced, and the camera shake state detected by the camera shake detecting section; and a monitor control section which executes a control in such a manner that the image data in which the influence of the camera shake is reduced and the image data at the time of the non-operation of the camera shake correcting section are displayed on the monitor.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

In a camera in each embodiment of the present invention described below; a position of an image pickup device is controlled, or image data from the image pickup device is processed, and accordingly the image data is acquired in which an influence of camera shake is reduced. Moreover, the image data in a state in which the influence of the camera shake is not reduced is also acquired by detection of a camera shake state of the camera. Furthermore, these two acquired image data are displayed on a monitor, and accordingly it is possible to confirm presence/absence of an effect of camera shake correction even in a camera including an optical finder.

A user cannot experience an additional value of a camera provided with a camera shake correction function without this technique of the confirmation of the effect of the camera shake correction. The user cannot correctly recognize the technique of the camera shake correction, although from the technique, even a maker obtains more than made up for demerits such as a cost and a space necessary for performing the camera shake correction. As a result, there is also a possibility that an advancement of the camera shake correction technique stops.

Embodiments of the present invention will be described with reference to the drawings.

[First Embodiment]

Figure 1:
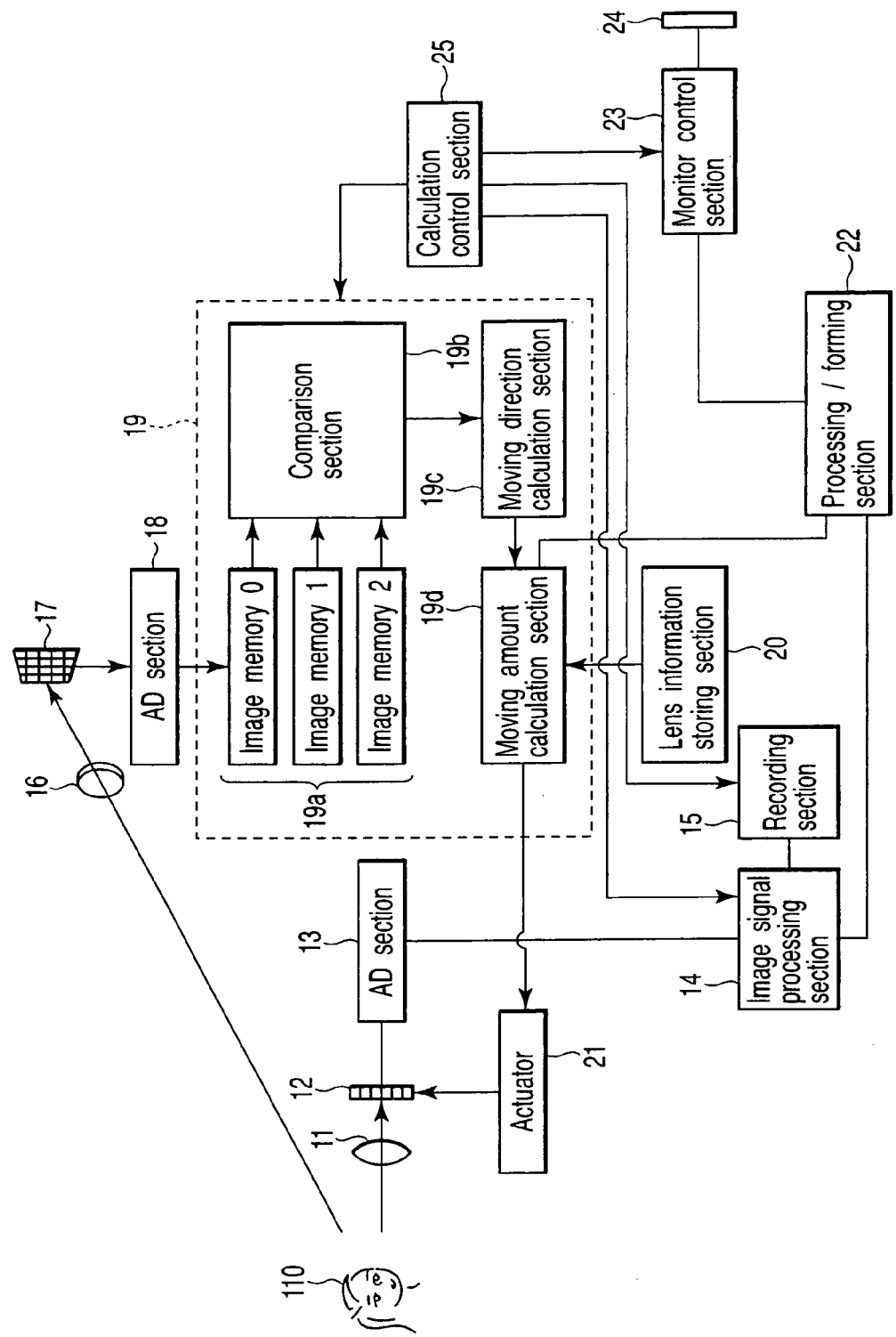
FIG. 1 is a block diagram showing a schematic constitution of a camera according to a first embodiment of the present invention.

FIG. 1 is a block diagram showing a schematic constitution of a camera according to a first embodiment of the present invention. As shown in FIG. 1, the camera of the first embodiment is constituted of: an optical photographing system 11; a main image pickup device 12 which is an image pickup device; an AD conversion section 13 (shown as the AD section 13 in FIG. 1); an image signal processing section 14; a recording section 15; a light receiving lens 16; a sub-image pickup device 17; an AD conversion section 18; a camera shake detecting section 19; a lens information storing section 20; an actuator 21; a processing/forming section 22; a monitor control section 23; a monitor 24; and a calculation control section 25.

The optical photographing system 11 is constituted of a plurality of optical lenses and the like, and converges a reflected luminous flux from a subject to form a subject image by the main image pickup device 12. The main image pickup device 12 performs photoelectric conversion and the like with respect to the subject image which has received via the optical photographing system 11 to produce an image signal. The AD conversion section 13 converts the image signal by an analog signal produced/output by the main image pickup device 12 into a digital image signal having a predetermined format to output the signal to the image signal processing section 14.

The image signal processing section 14 subjects the digital image signal converted by the AD conversion section 13 to predetermined image processing, for example, image adjustments such as tone correction, gradation correction, and gamma (γ) correction of the image which is to be represented by the image data. The recording section 15 is constituted of various mediums and recording control sections in which the image data is recorded in predetermined configurations. The recording section 15 records the image data produced by the image signal processing section 14. The image signal processing section 14 also outputs the produced image data to the processing/forming section 22.

Moreover, the reflected luminous flux from the subject is converged in the light receiving lens 16, and is also formed into an image on the sub-image pickup device 17. The sub-image pickup device 17 subjects the formed subject image to the photoelectric conversion and the like to produce the image signal, and thereafter outputs the signal to the AD conversion section 18. The AD conversion section 18 converts the input image signal into a digital signal, and thereafter outputs the signal to the camera shake detecting section 19.

Figure 2:
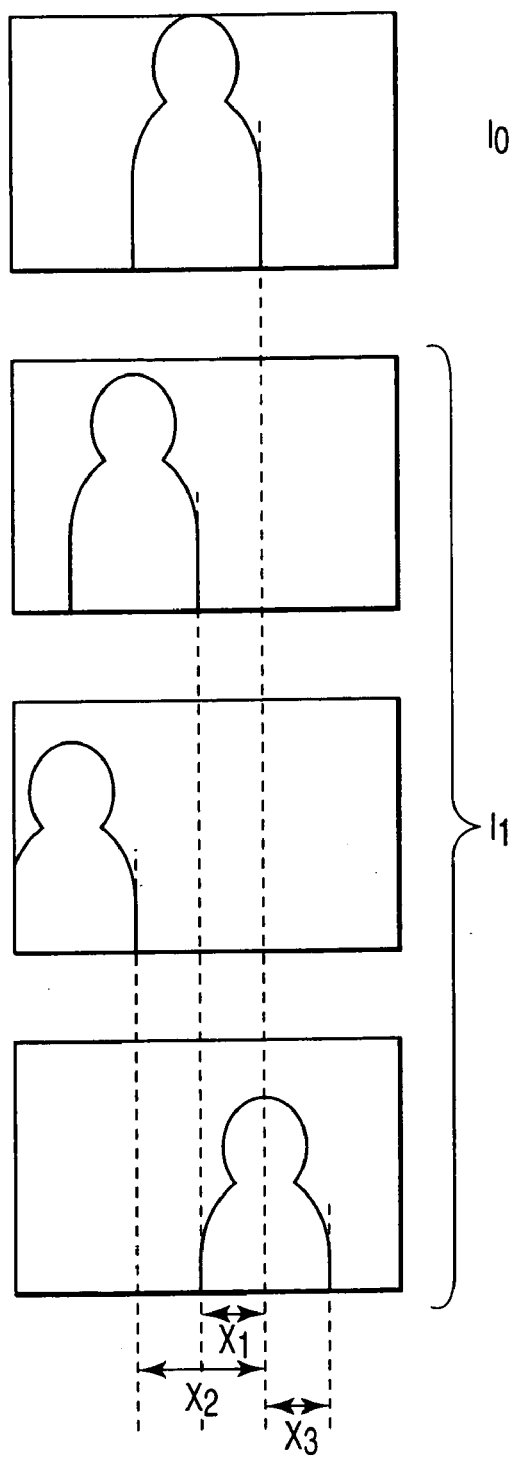
FIG. 2 shows an example of an image picked up in an image pickup device.

The camera shake detecting section 19 is constituted of a plurality of (only three are shown) image memories 19a, a comparison section 19b, a moving direction calculation section 19c, and a moving amount calculation section 19d. The image signal input from the AD conversion section 18 is successively recorded in the image memories 19a inside the camera shake detecting section 19. The recording is repeatedly performed during exposure of the main image pickup device 12. As a result, images shown, for example, in FIG. 2 are recorded in the image memories 19a. Additionally, the image is not picked up in a sufficient exposure time in the sub-image pickup device 17. Therefore, the image signal obtained by the sub-image pickup device 17 contains noise components, and an image quality of the image signal is inferior to that of the image signal acquired by the main image pickup device 12. However, it is possible to judge movement of the image. Then, the image signals successively recorded in the image memories 19a are compared with one another in the comparison section 19b to detect the movement of the image.

The moving direction calculation section 19c determines a moving direction of the main image pickup device 12 based on comparison results in the comparison section 19b. The moving amount calculation section 19d calculates a moving amount of the main image pickup device 12 from the comparison results in the comparison section 19b and lens information stored in the lens information storing section 20. Here, the lens information stored in the lens information storing section 20 includes focal distance information and the like of lenses constituting the optical photographing system 11. Among the lenses constituting the optical photographing system 11, in a telescopic lens having a long focal distance, since a camera shake amount is large, the moving amount of the main image pickup device 12 increases. On the other hand, in a wide-angle lens having a short focal distance, since the camera shake amount is small, the moving amount of the main image pickup device 12 becomes small.

As described above, after the moving direction and the moving amount of the main image pickup device 12 are calculated, the camera shake detecting section 19 controls the actuator 21, and moves the main image pickup device 12 to reduce the influence of the camera shake. That is, even when the camera shake occurs during the exposure, the main image pickup device 12 is moved in accordance with the generated camera shake, and therefore light receiving on each pixel of the main image pickup device 12 is unchanged before/after the generation of the camera shake. As a result, the image signal acquired by the main image pickup device 12 has a state in which the influence of the camera shake on the image signal is reduced.

Moreover, the moving amount calculation section 19d in the camera shake detecting section 19 also outputs calculation results to the processing/forming section 22. The processing/forming section 22 processes the image data input from the image signal processing section 14 based on the calculation result in the camera shake detecting section 19, and thereafter outputs the data to the monitor control section 23. The monitor control section 23 displays the image on the monitor 24 constituted of, for example, a liquid crystal display (LCD) and the like based on the image data input from the processing/forming section 22.

The above-described processes are generally controlled by the calculation control section 25 constituted of a one-chip microcontroller such as a central processing unit (CPU).

Next, a photographing control including a camera shake correction function in the camera of the first embodiment will be described in more detail. Here, the control is performed by microcontrollers (not shown) in the calculation control section 25 and the camera shake detecting section 19 according to a flowchart shown in FIG. 3.

First, the lens information stored in the lens information storing section 20 is read by the camera shake detecting section 19 (step S1). Next, the image signal is taken in using the sub-image pickup device 17 to thereby start camera shake detection (step S2), and the taken in image signal is recorded as a reference image signal $I_0$ into the image memory 19a (step S3).

Thereafter, the exposure is started (step S4). Moreover, an image signal $I_1$ is taken in using the sub-image pickup device 17 again (step S5), and the taken-in image signal $I_1$ is compared with the reference image signal $I_0$ recorded in the image memory 19a in the step S3 to calculate a camera shake direction and amount (step S6). Next, the moving direction and amount of the main image pickup device 12 are determined by the detected camera shake direction and amount (step S7), and the actuator 21 is driven to move the main image pickup device 12 in accordance with the results (step S8).

Next, the calculation control section 25 judges whether or not the exposure is ended (step S9). This is performed by judging whether or not a predetermined exposure time has elapsed. When it is judged that the exposure is not ended yet in the judgment of the step S9, the process returns to the step S5. That is, the process of the steps S5 to S9 is repeatedly performed until the exposure ends.

Figure 4:
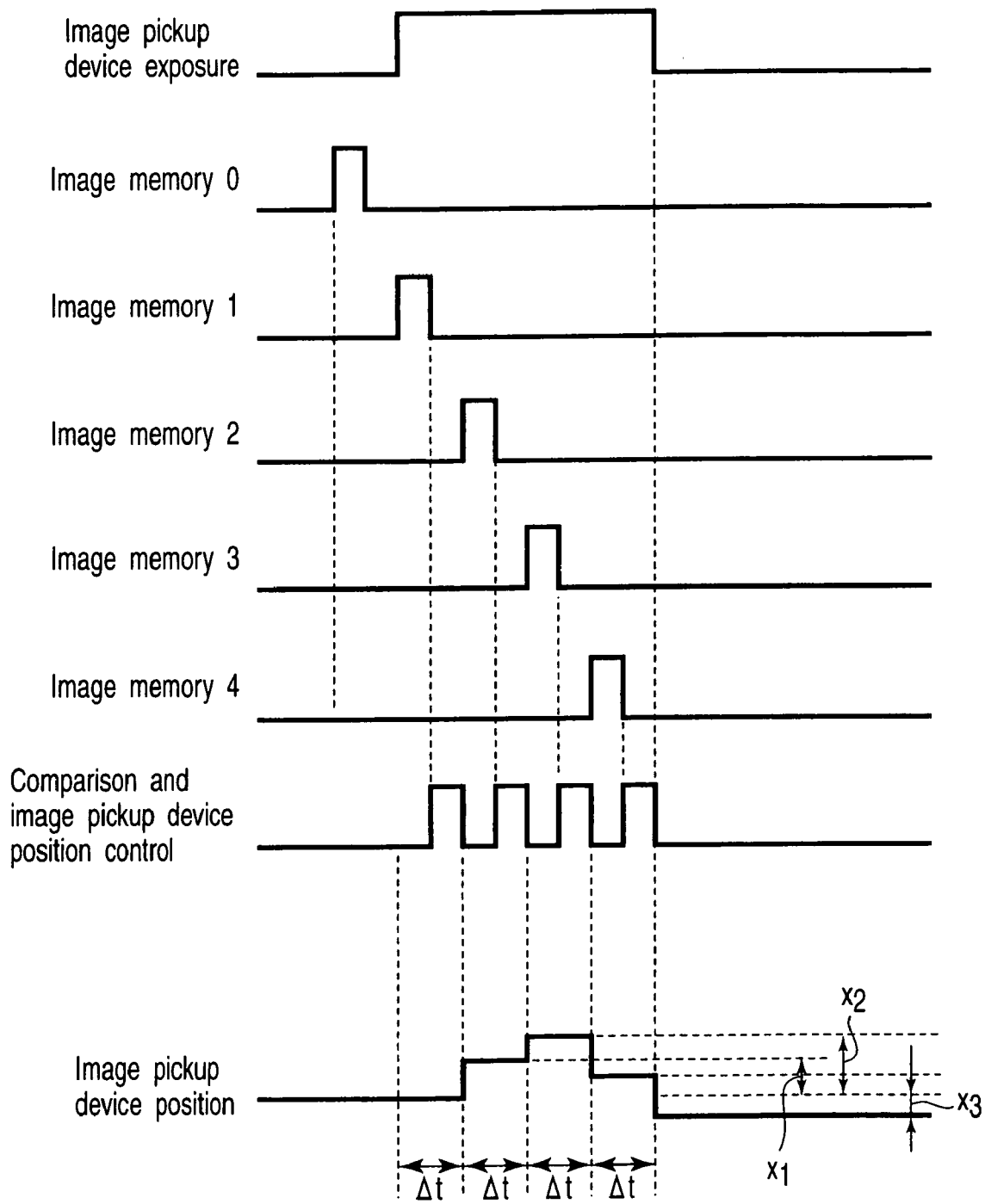
FIG. 4 is a timing chart at the time of camera shake photographing of the camera according to the first embodiment of the present invention.

FIG. 4 is a timing chart in the process of the steps S3 to S9. First, the reference image signal $I_0$ is taken in and recorded into an image memory (image memory 0) before start of the exposure. After the start of the exposure, the image signal $I_1$ is recorded in image memories (image memories 1 to 4) every time $\Delta t$, and thereafter the image signal $I_1$ is compared with the reference image signal $I_0$ to calculate the camera shake direction and amount. The position of the main image pickup device 12 is controlled based on the calculation result.

Here, the calculation of the camera shake direction and amount by the comparison of the image signals will be described with reference to FIG. 2. It is to be noted that the camera shake includes vibrations in x and y-directions, but only the camera shake in the x-direction will be described here for simplicity. That is, in the calculation of the camera shake direction and amount, the vibration direction and amount ($x_1$ to $x_3$) of the image signal $I_1$ with respect to the reference image signal $I_0$ are detected to calculate the camera shake direction and amount. Moreover, when the actuator 21 is controlled to move the main image pickup device 12 based on the calculation result, the influence of the camera shake is reduced.

Here, when there is camera shake even in the y-direction, the camera shake direction and amount in the y-direction are calculated in the same manner as in the x-direction, and the main image pickup device 12 may be moved in the y-direction based on the calculation result.

Here, returning to FIG. 3, when it is judged in the judgment of the step S9 that the exposure is to be ended, the calculation control section 25 controls a shutter (not shown) and the like to end the exposure (step S10), and starts reading the image signal to digitize the read image signal in the AD conversion section 13 (step S11). Moreover, after the image signal processing section 14 performs predetermined image processing (step S12). The image data is recorded in the recording section 15 (step S13). Thereafter, the calculation control section 25 controls the monitor control section 23 to display the image recorded in the recording section 15 on the monitor 24 (step S14).

The image displayed in the step S14 is an image performed to the camera shake correction. In the first embodiment, an image at the time when the actuator 21 as a camera shake correcting section is not operated is displayed on the monitor 24, so that a user further understands the effect of the camera shake correction. This is performed as follows. That is, the calculation control section 25 judges whether or not to display an image that is not performed to the camera shake correction (step S15). The judgment of the step S15 may be performed by judging a state of operation of a switch (not shown) by the user. When it is judged in the judgment of the step S15 that the image is not displayed, the process of the flowchart of FIG. 3 ends.

On the other hand, it is judged in the judgment of the step S15 that the image that is not performed to the camera shake correction is to be displayed. In this case, image data that is not performed to the camera shake correction is formed in a pseudo manner based on the image data produced in the image signal processing section 14 and the calculation result in the camera shake detecting section 19 (step S16). The image data may be formed, for example, by synthesizing the image signals of FIG. 2 upon one another. Moreover, the calculation control section 25 controls the monitor control section 23 to display the image which is not performed to the camera shake correction and that which has been performed to the camera shake correction in parallel on the monitor 24 (step S17). In this case, the images are displayed in parallel in different regions on a monitor screen as shown, for example, by reference numerals 24a and 24b of FIG. 5.

When the image that is not performed to the camera shake correction is displayed simultaneously with the image performed to the camera shake correction has been performed in this manner, the user can further understand a value of the camera shake correction function of the camera, and user's photographing technique can be improved. For example, when the user tries the photographing keeping the camera shake in mind, the user can take a photograph without any blurring even with a camera that does not have the camera shake correction function.

Moreover, at the time of purchasing of the camera, the user take photographs to see the image that is not performed to the camera shake correction and the image performed to the camera shake correction, and can judge that either of the camera having the camera shake correction function and the camera that does not have the camera shake correction function is suitable for the user.

Furthermore, the image display described in the first embodiment is not limited to the display on the monitor of the camera, and the image may be displayed on the monitor of a personal computer or the like. Two images may be arranged at the time of printing. In this case, at the time of recording of the image, the recording is controlled in such a manner that the image data that is not performed to the camera shake correction is recorded in the recording section 15.

Figure 6:
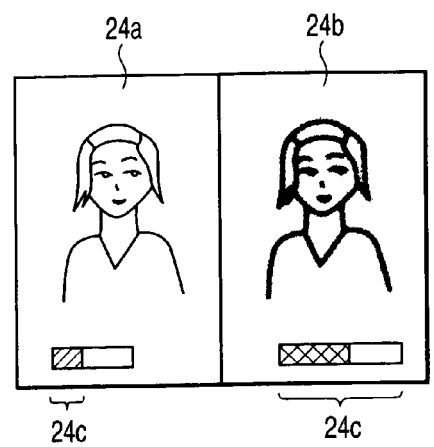
FIG. 6 is a diagram showing a second display example of the image displayed on the monitor according to the technique of the first embodiment of the present invention.
Figure 7:
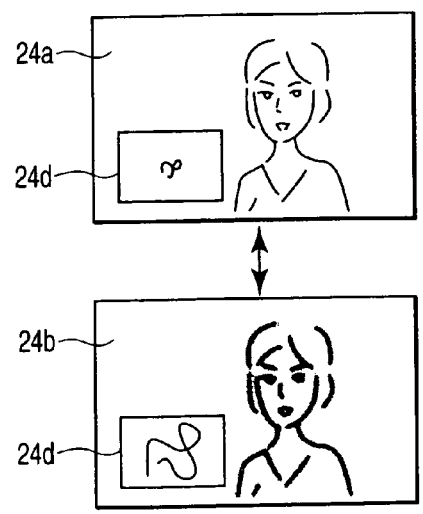
FIG. 7 is a diagram showing a third display example of the image displayed on the monitor according to the technique of the first embodiment of the present invention.

Moreover, during the parallel display, as shown in FIG. 6, a gauge 24*c* indicating the camera shake amount generated during the photographing may be displayed. In this case, when the camera shake amount exceeds an allowable amount, the gauge may be displayed in a changed color. Furthermore, as shown in FIG. 7, the image performed to the camera shake correction and the image that is not performed to the camera shake correction may be switched and displayed. A track 24*d* of the camera shake generated at the time of the photographing may be displayed together with the image.

Figure 8:
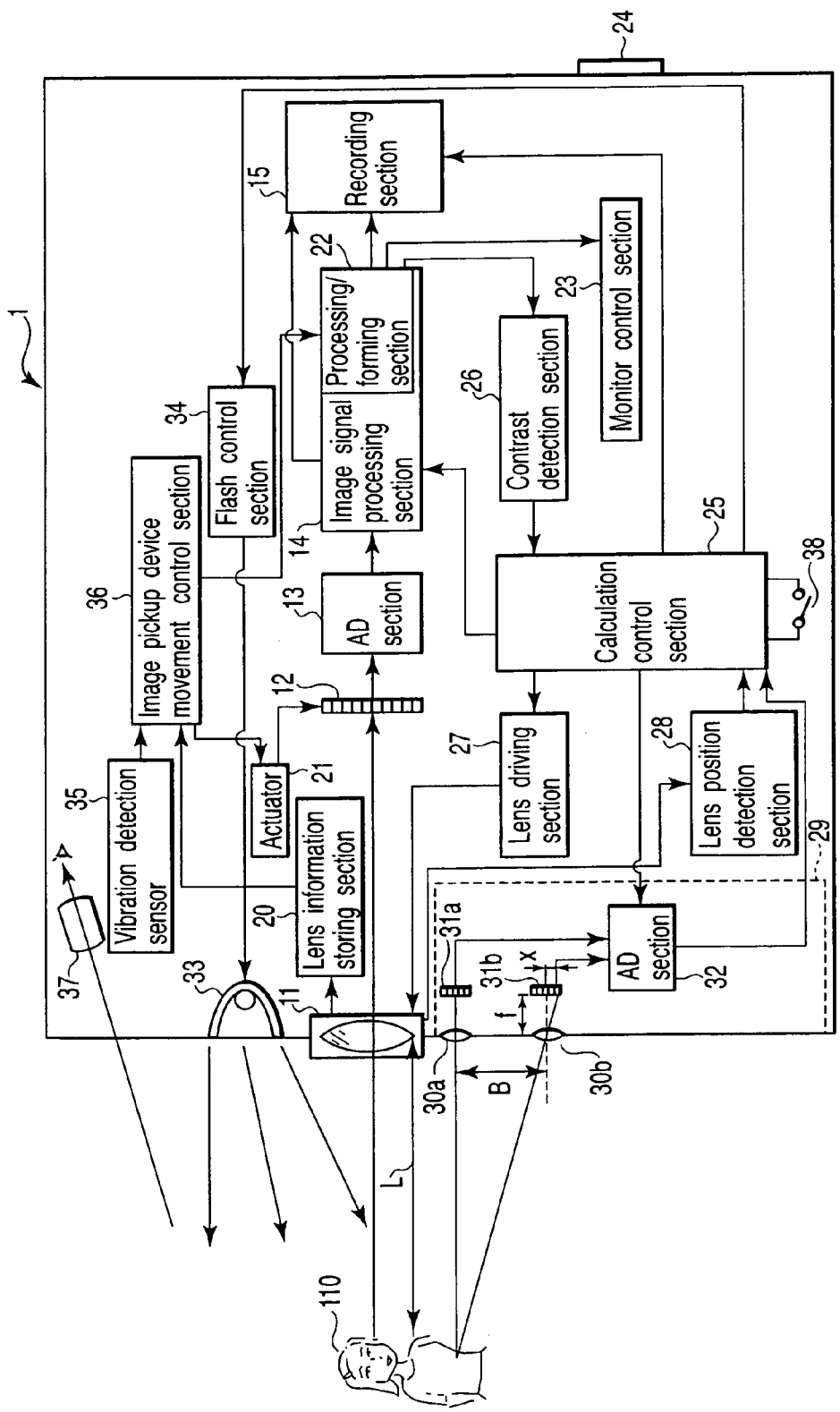
FIG. 8 is a block diagram in a case where the technique of the first embodiment of the present invention is applied to a compact camera.

FIG. 8 is a block diagram in a case where the technique of the first embodiment is applied to a general digital camera.

That is, in the camera of FIG. 8, a subject image formed by an optical photographing system is photoelectrically converted by an image pickup device such as a CCD, and an electric signal (image signal) obtained by photoelectric conversion is recorded in a predetermined configuration in a predetermined recording medium. Here, in an example of FIG. 8, an example of a so-called compact camera having a comparatively simple constitution between the optical photographing system and the image pickup device will be described.

Here, in the camera having the camera shake correction function, the influence of the camera shake is sometimes reduced by movement of an optical photographing system 11. However, in this system, the influence of the camera shake can be corrected only in a case where a specific lens is used. Therefore, the example of FIG. 8 also adopts the system in which an image pickup device 12 (the main image pickup device of FIG. 1 will be hereinafter referred to simply as the image pickup device) is moved to correct the camera shake.

In the following description, only parts different from those of FIG. 1 will be described. The same parts as those of FIG. 1 are denoted with the same reference numerals, and description thereof is omitted.

In FIG. 8, a processing/forming section 22 of FIG. 1 is also included and shown in an image signal processing section 14. Furthermore, the image signal processing section 14 also outputs a digital image signal performed to image processing to a contrast detection section 26. The contrast detection section 26 detects a contrast signal of a subject from an output of the image signal processing section 14, and outputs the signal to a calculation control section 25.

The calculation control section 25 judges the contrast signal detected by the contrast detection section 26 while moving the optical photographing system 11 in a direction along an optical axis via a lens driving section 27. The calculation control section 25 detects the position of the optical photographing system 11 by a lens position detection section 28, and calculates a distance L (hereinafter referred to as the subject distance L) from a camera 1 to a subject 110 from a relation between a focal position of the optical photographing system 11 and a lens position detected by the lens position detection section 28.

Here, when the camera 1 includes a distance measuring section 29 as shown in FIG. 8, the subject distance L from the camera 1 to the subject 110 can be obtained based on a subject image that has received via an optical system different from the optical photographing system 11.

That is, the subject image which has struck via a pair of light receiving lenses 30*a*, 30*b* in the distance measuring section 29 is formed into an image on a pair of sensor arrays 31*a*, 31*b*. Outputs of the pair of sensor arrays 31*a*, 31*b* are digitized by an AD conversion section 32, and are thereafter output to the calculation control section 25. The calculation control section 25 compares two image signals input from the AD conversion section 32 with each other, and calculates the subject distance L from a relative positional difference x between detected positions of two image signals, a lens parallax B, and a focal distance f based on a principle of triangular measurement, that is, $$L=Bf/x.$$

A focusing control for auto focusing, a control of a quantity of light of a flash section 33 and the like can be performed based on the subject distance L. The calculation control section 25 controls a flash control section 34 based on the subject distance L obtained by the distance measuring section 29 in such a manner that the flash section 33 emits an auxiliary illuminative light.

Moreover, in FIG. 8, a vibration detection sensor 35 and an image pickup device movement control section 36 are disposed instead of a camera shake detecting section 19. The vibration detection sensor 35 is constituted of, for example, a known angular speed sensor, an acceleration sensor and the like, and detects a vibration amount of the camera 1, that is, the camera shake amount. Subsequently, the detection result is output to the image pickup device movement control section 36. The image pickup device movement control section 36 determines the moving direction and amount of the image pickup device 12 from the detection result of the vibration detection sensor 35 and lens information stored in a lens information storing section 20, and controls an actuator 21 to move the image pickup device 12 based on the determined moving direction and amount.

Moreover, the user can also observe the subject via an optical finder 37. Here, it is difficult to know an effect of camera shake correction as described above on the optical finder 37. However, when the camera shake correction is performed as in the first embodiment, the image performed to the camera shake correction is displayed on the monitor, not on the optical finder 37, and therefore the user can easily see and confirm the effect of the camera shake correction.

Furthermore, a switch 38 of FIG. 8 indicates a switch group for allowing the calculation control section 25 to start various controls.

Figure 9:
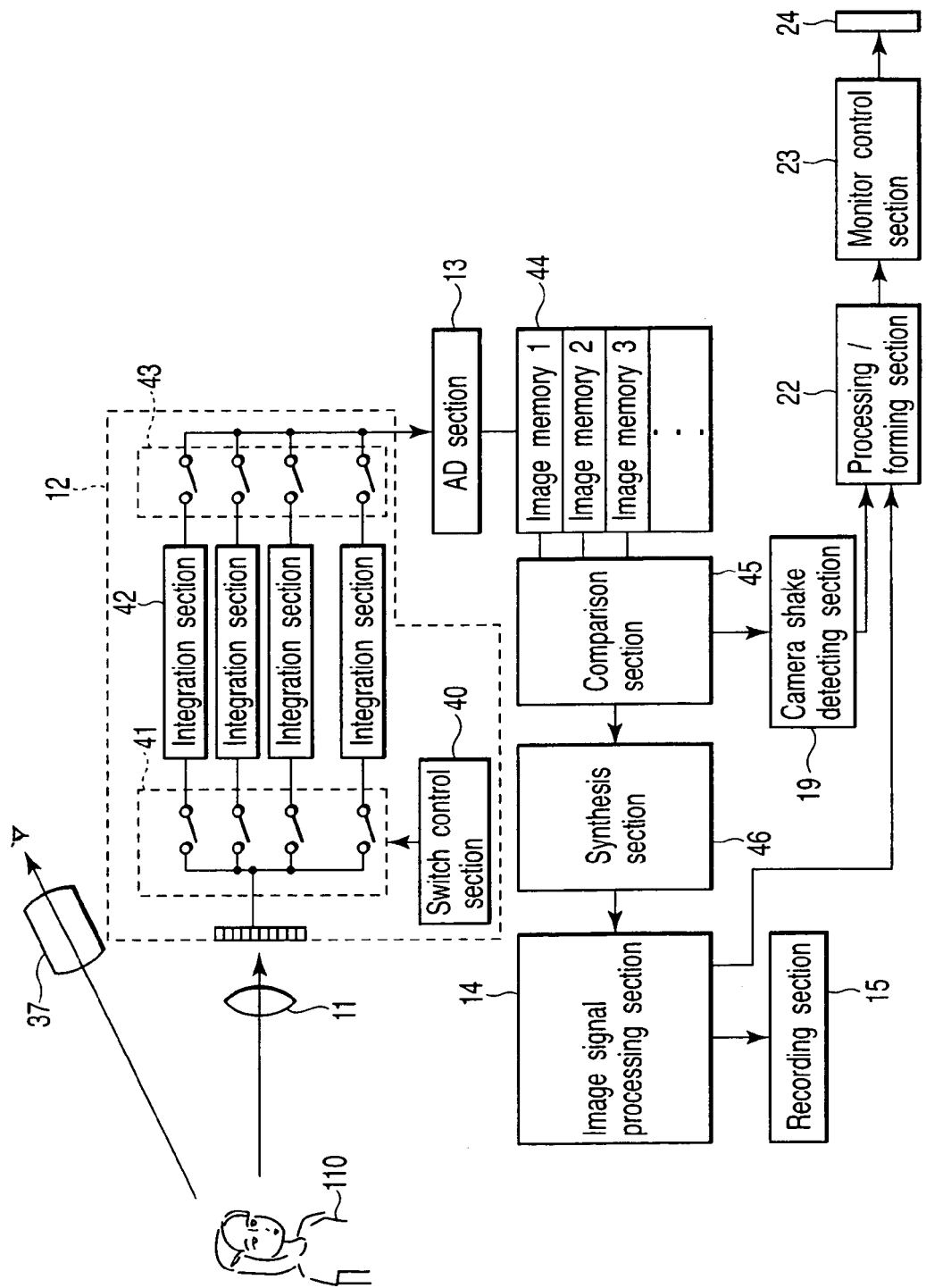
FIG. 9 is a block diagram showing a modification of a technique of camera shake correction.
Figure 10:
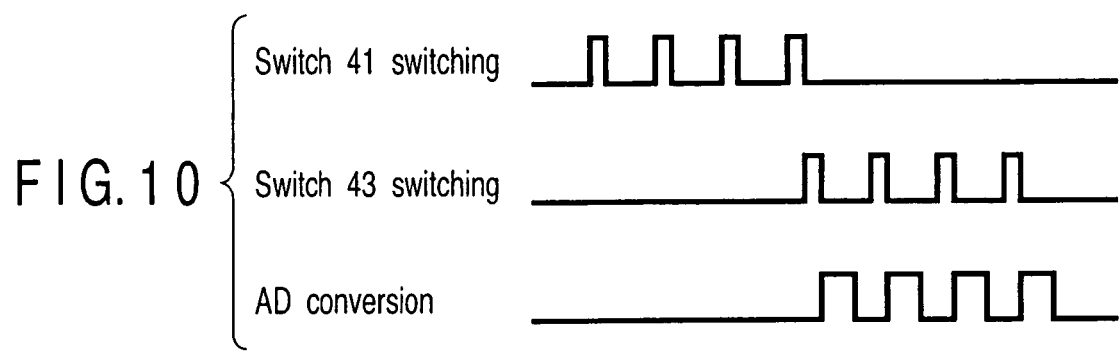
FIG. 10 is a timing chart at the time of camera shake correction in the modification shown in FIG. 9.

Next, a technique of camera shake correction different from the technique in which the image pickup device is moved to reduce the influence of the camera shake will be described with reference to FIG. 9. That is, in FIG. 9, the camera shake is corrected based on electric processes. The camera shake correction is performed according to a timing chart of FIG. 10. That is, to photograph a subject 110 via an optical photographing system 11, an output of an image pickup device 12 is successively guided into integration sections 42 using a switch control section 40 and switches 41.

Here, the switch is operated in a short time in such a manner that the operation is not influenced by camera shake as described with reference to the timing chart of FIG. 4. Accordingly, analog image signals which are not influenced by the camera shake are output from the integration sections 42. The image signals are successively read via switches 43. Accordingly, digital image signals which are not influenced by the camera shake are successively recorded in image memories 44.

Figure 11:
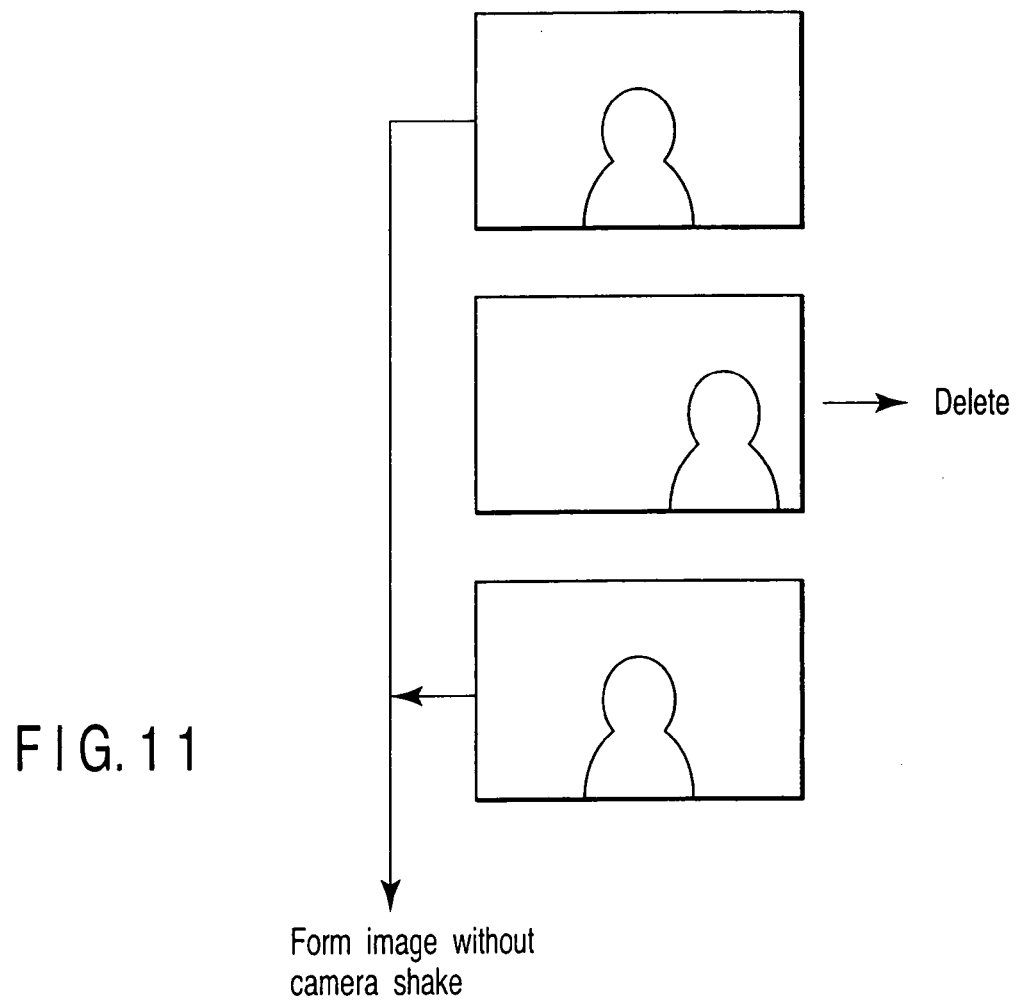
FIG. 11 is an explanatory view of an image synthesis process in the modification shown in FIG. 9.

As a result, a plurality of image signals are obtained by performing photographing once as shown in FIG. 11. The image signals obtained from the image pickup device 12 are input into a comparison section 45 in different timings. In the comparison section 45, image signals largely different from other image signals are deleted from input image signals, and an image signal having a high coincidence is selected and input into a synthesis section 46. The synthesis section 46 synthesizes the input image signals to cancel random noises. This raises an S/N of the signal. The image signal obtained in this manner is input into an image signal processing section 14.

After the image is processed in the image signal processing section 14 in the same manner as described above, image data is recorded into a recording section 15.

Even in this camera shake correction system, an effect of camera shake correction cannot be seen using an optical finder. However, image data which is not performed to the camera shake correction is formed in a pseudo manner in a processing/forming section 22 based on the image data performed to the camera shake correction and camera shake information as in the first embodiment, an image is displayed on a monitor 24 based on the image data, and then the effect of the camera shake correction can be easily visually confirmed.

Figure 12:
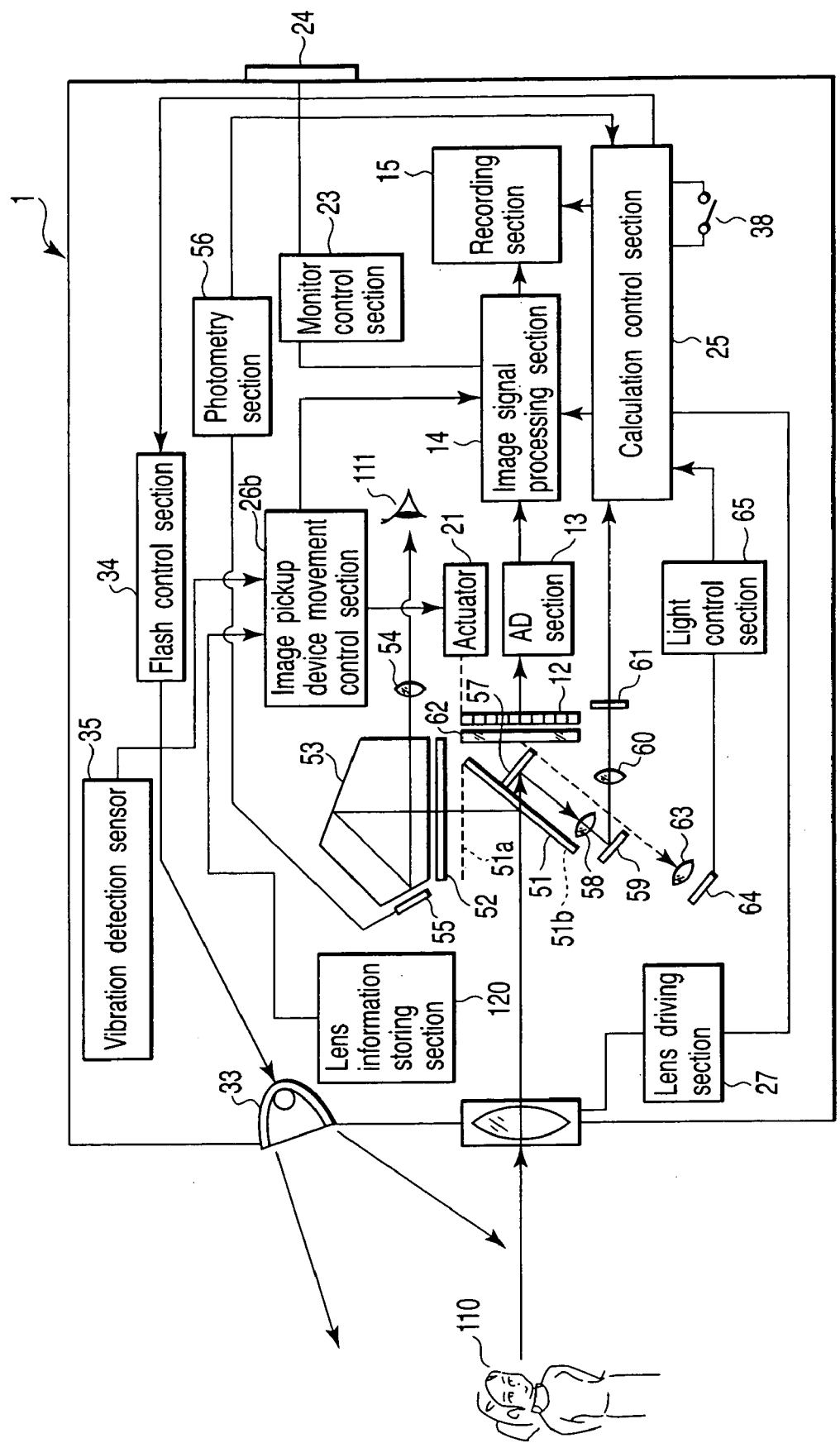
FIG. 12 is a block diagram in a case where the technique of the first embodiment of the present invention is applied to a single-lens reflex camera.

FIG. 12 is a block diagram of an electric circuit in a case where the technique of the first embodiment of the present invention is applied to a single-lens reflex camera. It is to be noted that a part of a constitution of the present camera is similar to that of the camera of FIG. 8. Therefore, similar constituting members are denoted with the same reference numerals and detailed description thereof is omitted. In the example of FIG. 12, an image pickup device 12 is moved by an actuator 21 to correct camera shake, but, needless to say, the technique described with reference to FIG. 9 may be applied.

That is, in addition to the constitution of FIG. 8, the present camera 1 includes: a movable mirror 51; an optical finder system (constituted of a screen 52, a pentagonal prism (hereinafter abbreviated as penta-prism) 53, an eyepiece lens 54 and the like); an in-finder photometry sensor 55; a light control section 56; a sub-mirror 57; a field lens 58; a light path bending mirror 59; an image re-forming lens 60; a sensor array 61; a shutter curtain 62; an optical photometry system 63; an in-body photometry sensor 64; and a light control section 65.

The movable mirror 51 is constituted to be rotatable between a position (hereinafter referred to as a retreated position 51a) retreated from a light path of the optical photographing system 11 and a position (hereinafter referred to as a normal position 51b) disposed on the light path of the optical photographing system 11 in a space between the shutter curtain 62 and the optical photographing system 11. Here, when the movable mirror 51 is disposed in the normal position 51b, the mirror is fixed in an inclined state by an angle of about 45 degrees with respect to an optical axis of the optical photographing system 11. In this state, a reflective surface of the movable mirror 51 is set in such a manner as to turn toward the optical finder system.

That is, when the movable mirror 51 is in the normal position 51b, a luminous flux that has received via the optical photographing system 11 is reflected by the movable mirror 51 and guided into the optical finder system. In the optical finder system, the received luminous flux is formed into an optical image in the screen 52, and the formed image is guided to the penta-prism 53. The penta-prism 53 guides an image transmitted through the screen 52 in a direction of the eyepiece lens 54 (i.e., behind the camera 1), and horizontally reverses the image. The eyepiece lens 54 enlarges the received image. Accordingly, a photographer 111 can observe the subject.

Figure 13:
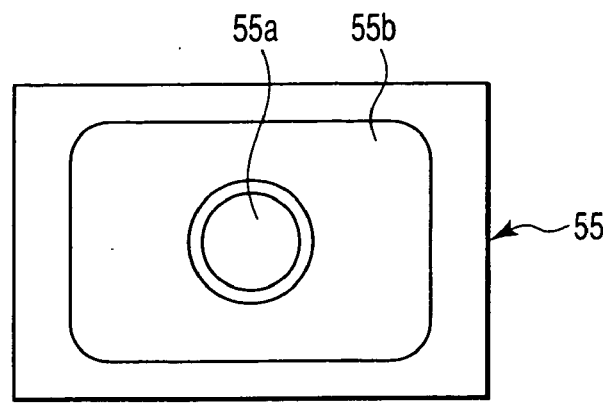
FIG. 13 is an explanatory view of a photometry region of a photometry sensor in a finder.

Furthermore, the in-finder photometry sensor 55 is disposed in the vicinity of the penta-prism 53. The in-finder photometry sensor 55 receives a part of the luminous flux which has received on the penta-prism 53 to output a predetermined electric signal to the light control section 56. Here, the in-finder photometry sensor 55 is formed in such a manner as to perform a photometry operation in a predetermined light receiving region in a photographing screen as shown in FIG. 13. That is, the in-finder photometry sensor 55 is constituted of: a light receiving section 55a for photometry of a predetermined region in the vicinity of a substantial middle portion; and a light receiving section 55b for photometry of a predetermined region in the vicinity of a substantially peripheral edge portion, and is constituted in such a manner that detection in a backlight state is also possible.

The light control section 56 performs the photometry operation based on the electric signal input from the in-finder photometry sensor 55, and detects brightness of the subject. A calculation control section 25 controls a flash control section 34 based on the detection result of the light control section 56.

Moreover, a partial region of the movable mirror 51, for example, a region in the vicinity of the substantial middle portion is constituted of a semi-transmission mirror in such a manner that a part of the luminous flux from the optical photographing system 11 can be transmitted. Moreover, the sub-mirror 57 is disposed in a portion facing the region constituted of the semi-transmission mirror.

That is, the sub-mirror 57 is supported in such a manner that one end portion of the mirror is rotatable in a predetermined direction with respect to the back surface of the movable mirror 51, that is, the surface facing the image pickup device 12. Accordingly, the reflective surface of the sub-mirror 57 is disposed to face the region of the semi-transmission mirror of the movable mirror 51. That is, the sub-mirror 57 is disposed to form a predetermined angle with respect to the movable mirror 51 as shown in FIG. 12, when the movable mirror 51 is disposed in the normal position 51b. The sub-mirror 57 is disposed in such a predetermined position that the mirror substantially extends in parallel with the movable mirror 51, when the movable mirror 51 is disposed in the retreated position 51a. Accordingly, the movable mirror 51 moves to the retreated position 51a while the sub-mirror 57 also retreats from the light path of the optical photographing system 11.

That is., when the movable mirror 51 and sub-mirror 57 are in the normal positions, a part of the incident luminous flux transmitted through the optical photographing system 11 passes through the semi-transmission mirror region of the movable mirror 51, and is reflected by the sub-mirror 57. The luminous flux reflected here passes through the field lens 58, its light path is bent in a predetermined direction by the light path bending mirror 59, and the luminous flux then passes through the image re-forming lens 6. As a result, a pair of subject images are formed on the light receiving surface of the sensor array 61. The sensor array 61 converts the received subject image into an electric signal to output the signal to the calculation control section 25. Upon receiving this signal, the calculation control section 25 performs a predetermined focusing process.

Here, the focusing process may be performed using a generally applied TTL phase difference detection system. The TTL phase difference detection system will be briefly described. In this system, the calculation control section 25 controls the lens driving section 27 to move the optical photographing system 11 in a lens optical axis direction while monitoring an output of the sensor array 61. Moreover, when a pair of subject images output from the sensor array 61 have a predetermined positional relation, the control section judges a focus state, and stops the driving of the optical photographing system 11 at this time.

Moreover, the shutter curtain 62 is disposed in the vicinity of the light receiving surface of the image pickup device 12 as described above. That is, the image pickup device 12 is constituted to receive the luminous flux from the optical photographing system 11 only when the shutter curtain 62 has an open state. Here, a constitution of the shutter curtain generally used in a conventional single-lens reflex camera is applied. The constitution of the shutter curtain 62 will be described briefly with reference to a schematic diagram of FIG. 14.

Figure 14:
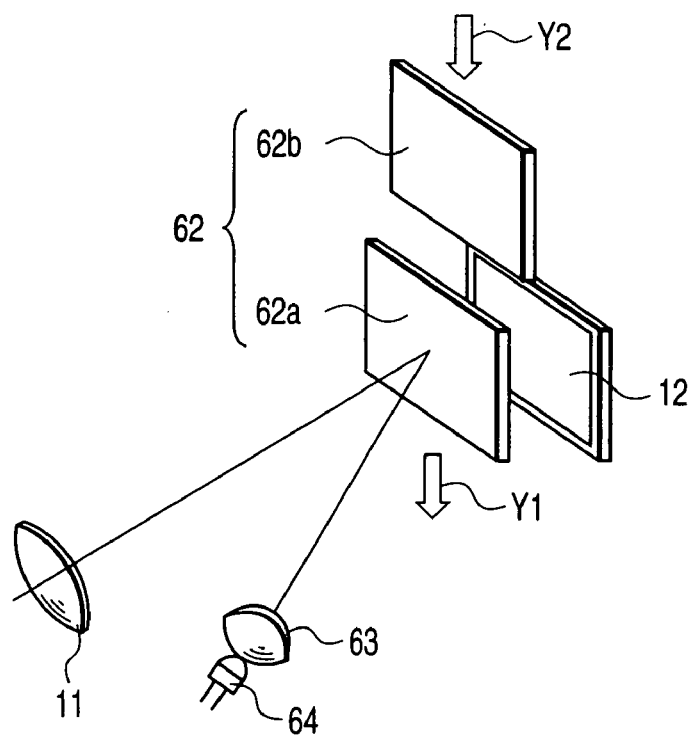
FIG. 14 is an explanatory view of a constitution of a shutter curtain.

As shown in FIG. 14, the shutter curtain 62 is constituted of two curtain members including a front curtain 62a and a rear curtain 62b. In the normal state, the front curtain 62a is disposed on the front surface of the light receiving surface of the image pickup device 12, and the light receiving surface of the image pickup device 12 is shielded.

Here, an exposure operation is executed. First, the movable mirror 51 and the sub-mirror 57 move to the predetermined retreated position 51a. In this state, the front curtain 62a starts moving in a direction of an arrow Y1. Subsequently, after a predetermined time, the rear curtain 62b starts moving in a direction of an arrow Y2 (the same direction as the direction Y1). Therefore, a predetermined gap is made between the front curtain 62a and the rear curtain 62b. When a gap dimension is adjusted, an exposure time to the image pickup device 12 can be adjusted. The gap dimension between the front curtain 62a and the rear curtain 62b is adjusted by adjustment of a time when the front curtain 62a and rear curtain 62b start moving.

Moreover, a predetermined pattern is formed on the surface of the front curtain 62a in such a manner that the luminous flux reflected on the surface of the front curtain 62a indicates a standard reflectance. The luminous flux reflected by the surface of the front curtain 62a is received by the in-body photometry sensor 64 via the optical photometry system 63. The in-body photometry sensor 64 converts the received luminous flux into an electric signal to output the signal to the light control section 65. The light control section 65 measures a quantity of incident light from the subject 110 and a predetermined light control based on the electric signal output from the in-body photometry sensor 64.

In the single-lens reflex camera, a quick return mirror constituted of the movable mirror 51 and the sub-mirror 57 retreats from the light path of the optical photographing system 11 during the photographing. Therefore, when the camera shake is corrected by an electric process or by movement of the image pickup device 12 by the actuator 21, the result of the camera shake correction cannot be observed via the optical finder system.

To solve the problem, even when the camera shake is corrected in the constitution shown in FIG. 12, the result of the camera shake correction is displayed on the monitor. Accordingly, the user can easily confirm the effect of the camera shake correction.

As described above, according to the first embodiment, the effect of the camera shake correction can be easily confirmed regardless of presence/absence of the optical finder.

[Second Embodiment]

Next, a second embodiment of the present invention will be described. The second embodiment is a modification of a process of and after the step S15 of the flowchart of FIG. 3. It is to be noted that the constitution described in the first embodiment is applicable to a hardware constitution.

Figure 15:
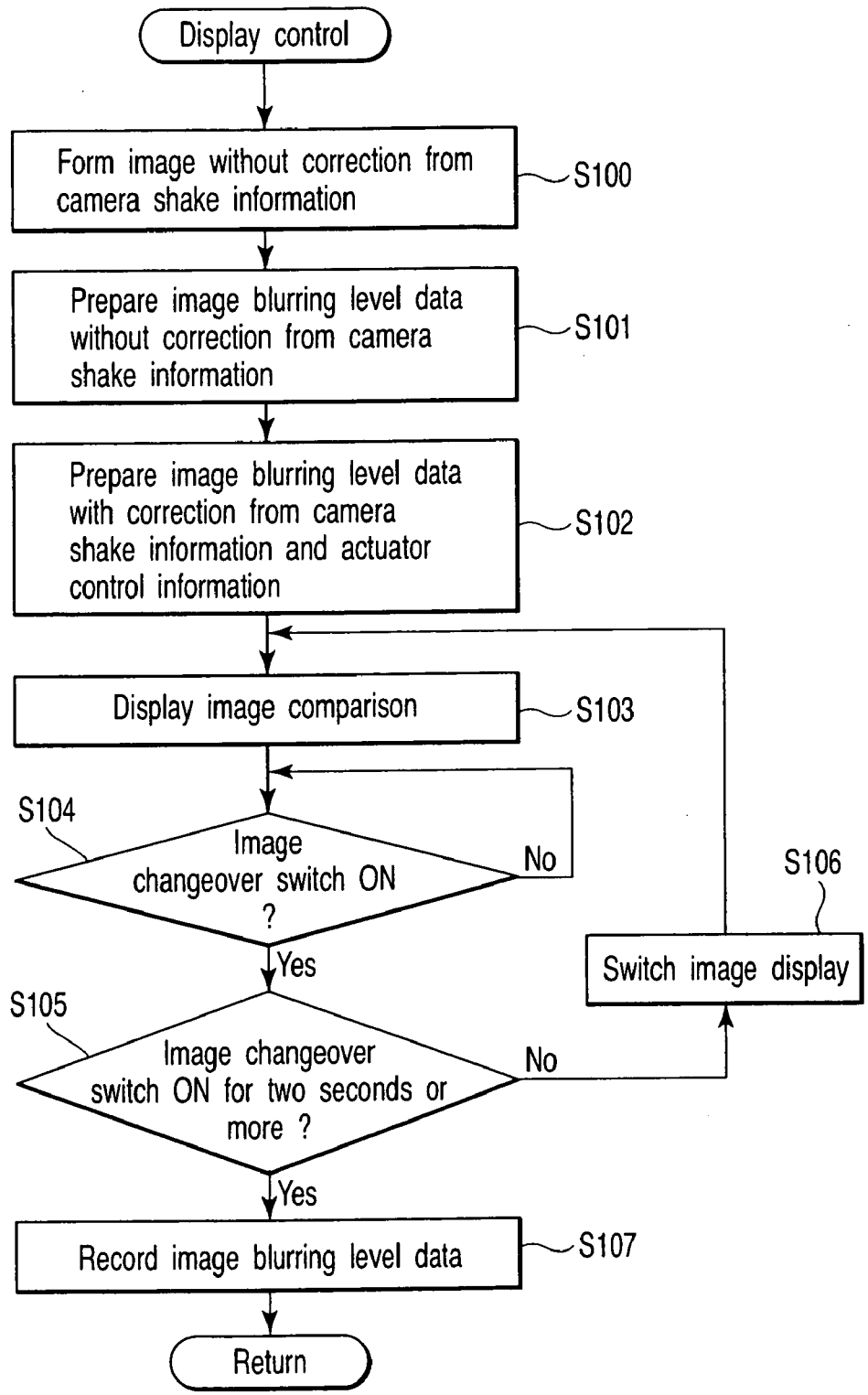
FIG. 15 is a flowchart showing control during display of camera shake correction in a second embodiment of the present invention.

FIG. 15 shows a flowchart of display control in the second embodiment.

Figure 5:
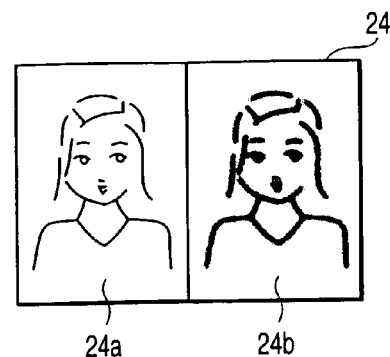
FIG. 5 is a diagram showing a first display example of an image displayed on a monitor according to a technique of the first embodiment of the present invention.

In the first embodiment, as shown in FIG. 5, the image that is not performed to the camera shake correction and the image performed to the camera shake correction are simultaneously displayed. However, since a size of a monitor mounted on a camera is limited, the effect of the camera shake correction cannot be confirmed on the monitor of the camera depending on a size of camera shake in some case. In other words, image blurring which has not been particularly noticeable during the confirmation on the monitor of the camera becomes conspicuous at the time of photograph printing in some case.

In the second embodiment, to solve the problem, image data (hereinafter referred to as first image data) performed to the camera shake correction is associated with an image blurring level generated in the first image data, and displayed on a monitor 24. Image data (hereinafter referred to as the second image data) which is not performed to the camera shake correction and an image blurring level considered to be generated in the second image data are displayed on the monitor 24. The display control will be described with reference to FIG. 15.

In the flowchart of FIG. 15, first a calculation control section 25 forms the second image data in a pseudo manner based on image data produced in an image signal processing section 14 and the calculation result in a camera shake detecting section 19 (step S100). The calculation control section 25 also prepares image blurring level data in a case where the camera shake correction has not been performed, that is, second image blurring level data from a camera shake amount detected by the camera shake detecting section 19 (step S101).

Next, the calculation control section 25 prepares image blurring level data in a case where the camera shake correction has been performed, that is, first image blurring level data from the camera shake amount detected by the camera shake detecting section 19 and control information of the actuator 21 at this time (step S102).

Figure 16A:
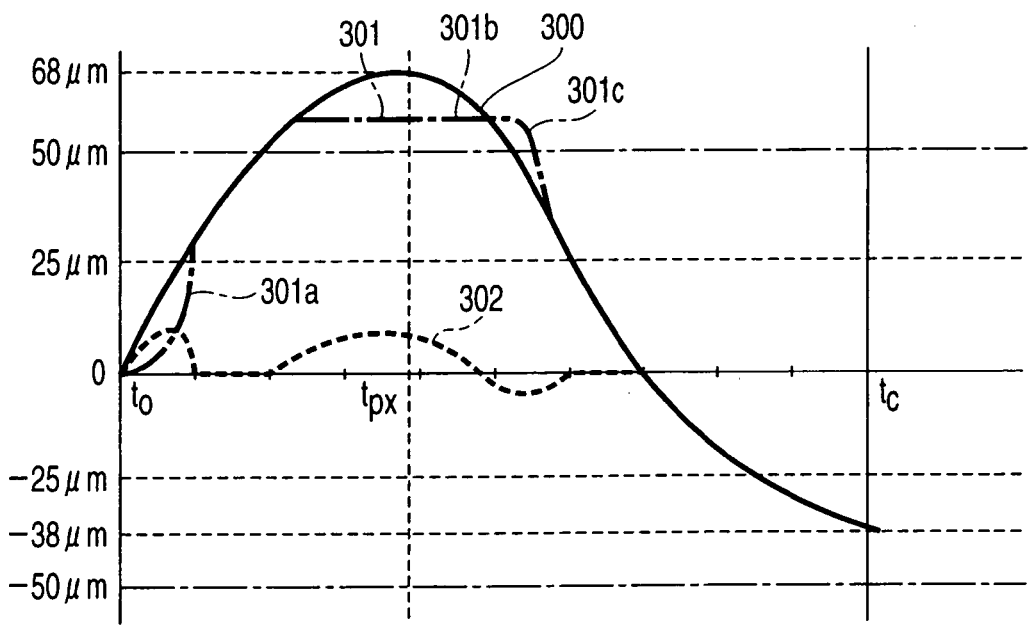
FIG. 16A is a diagram showing changes of image blurring with time with respect to an X-direction.
Figure 16B:
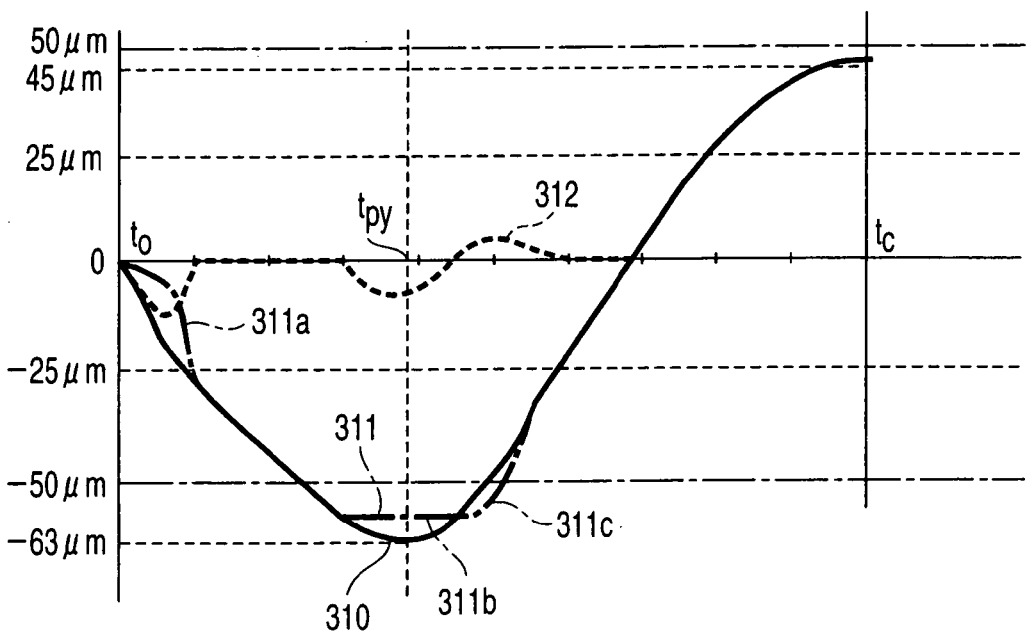
FIG. 16B is a diagram showing changes of image blurring with time with respect to a Y-direction.

Details of the controls of the steps S101 and S102 will be described. FIGS. 16A and 16B showing changes of image blurring with time at the time of the photographing. In these figures, when there is not any camera shake, an image on an image pickup device surface corresponding to one point on the subject is a point image. However, when there is the camera shake, the point image is not formed, and the image shakes on an image pickup surface in accordance with the camera shake. Here, a phenomenon in which the point image shakes, that is, a phenomenon in which the image shifts in a one-to-one correspondence with respect to the camera shake will be referred to as image blurring. FIG. 16A shows the change of the image blurring with time with respect to an X-direction in a case where a plane crossing an optical axis at right angles is an X-Y plane. On the other hand, FIG. 16B shows the change of the image blurring with time in a Y-direction.

In these figures, it is assumed that an exposure start time is $t_0$, and an exposure end time is $t_c$. In FIG. 16A, a curve 300 indicates the image blurring corresponding to the camera shake during the exposure in an X-axis direction. That is, the image blurring indicates image blurring in a case where the camera shake correction has not been performed. The image blurring shown by the curve 300 gradually increases at the time $t_0$ which is a base point, and a maximum image blurring amount on a plus side at a time $t_{px}$ is 68 µm. Thereafter, the image blurring gradually decreases, and indicates a maximum value of −38 µm on a minus side at the exposure end time $t_e$.

Here, the curve 300 simply indicates the image blurring in a case where the camera shake correction has not been performed. In actual, the actuator 21 is driven to move the image pickup device 12 in the X-Y plane and to correct the camera shake in accordance with the camera shake information detected by the camera shake detecting section 19. Here, a one-dot chain-line curve 301 in FIG. 16A shows a fluctuation of the position of the image pickup device 12 with time in the X-axis direction in a case where the image pickup device 12 is moved by the actuator 21 in order to prevent the image blurring caused by the camera shake.

In the camera shake correction, when the image blurring occurs, the image pickup device 12 is moved in a direction in which the image blurring occurs, the influence of the image blurring is reduced, and a photograph is taken as if any image blurring were not caused. That is, when the curve 300 completely matches the curve 301, the image blurring is completely cancelled out, and the photograph can be taken without any image blurring.

However, in FIG. 16A, the curve 300 does not completely match the curve 301. That is, when the image pickup device 12 is moved by the actuator 21, a mechanical response delay is generated, and this causes mismatch between the curves 300 and 301 as shown by reference numeral 301a or 301c of FIG. 16A. There is a restriction as to a moving range of the actuator 21. When the camera shake exceeds a maximum of the moving range of the actuator 21, the actuator 21 cannot follow the camera shake any more. In this case, the mismatch between the curves 300 and 301 is generated as shown by a reference numeral 301b of FIG. 16A.

For these reasons, the image blurring by the generation of the camera shake cannot be completely corrected, and the image blurring in the X-axis direction occurs as shown by a difference between the curves 300 and 301, that is, a curve 302.

On the other hand, this also applies to a Y-axis direction. Here, in the same manner as in the case of FIG. 16A, the image blurring in a case where the camera shake correction has not been corrected is shown by a curve 310 of FIG. 16B, and a fluctuation of the position of the image pickup device 12 with time in a case where the image pickup device 12 is moved by the actuator 21 is shown by a curve 311. Even in this case, a mismatch occurs between the curves 310 and 311 by a mechanical response delay as shown by reference numerals 311a and 311c or by the restriction of the moving range of the actuator 21 as shown by a reference numeral 311b.

As described above, the image blurring by the generation of the camera shake cannot be completely corrected, and the image blurring occurs with respect to the Y-axis direction as shown by a difference between the curves 310 and 311, that is, a curve 312.

In summary, the fluctuation of the image blurring level (first image blurring level) with time in a case where the camera shake correction has been performed is shown by the curve 302 with respect to the X-axis direction, and by the curve 312 with respect to the Y-axis direction. That is, when the image blurring is considered in the X-Y plane, these curves 302 and 312 are synthesized within the X-Y plane. The fluctuation of the image blurring level (second image blurring level) with time in a case where the camera shake correction has not been performed is shown by the curve 300 with respect to the X-axis direction, and by the curve 310 with respect to the Y-axis direction. That is, when the image blurring is considered in the X-Y plane, these curves 300 and 310 are synthesized within the X-Y plane.

Figure 17A:
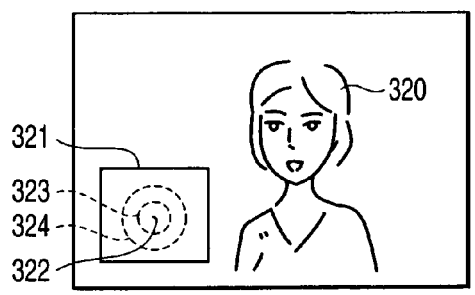
FIGS. 17A to 17C are diagrams showing display examples during display of effects of the camera shake correction according to a technique of a second embodiment of the present invention.

Here, returning to FIG. 15, after the image blurring level data is prepared in the step S102, the calculation control section 25 compares/displays the images on the monitor 24 (step S103). In this image comparison display, first, as shown in FIG. 17A, a first image blurring level display 321 associated with first image data 320 obtained when the camera shake correction is performed is visually displayed on the monitor 24.

The first image blurring level display 321 shows the image blurring generated when the camera shake correction is performed, corresponding to the first image data 320, as a track 322 of the image blurring represented in analog display in accordance with the size of the image blurring. Here, the track 322 of the image blurring is calculated from the curves 302 and 312. Further in the first image blurring level display 321, circle displays 323 and 324 which are indices indicating the size of the image blurring are displayed together with the track 322.

Here, the circle display 323 displays that the size of the image blurring by the camera shake indicates 25 µm. That is, when the track 322 of the image blurring is within the circle display 323, the image blurring can be hardly seen with human eyes.

Moreover, the circle display 324 displays that the size of camera shake indicates 50 µm. When the track 322 of the image blurring is in a range between the circle displays 323 and 324, the image blurs to such an extent that a slight influence of the image blurring is seen at the time of the photograph printing. At this level, some people notice the camera shake (image blurring), but the others do not. Furthermore, when the circle display 323 of the image blurring is outside the circle display 323, that is, the image blurring is larger than 50 µm, the camera shake (image blurring) is clearly noticeable in the printed photograph.

Figure 17B:

Here, when the track 322 of the image blurring is within the circle display 323 as shown in FIG. 17A, there is hardly an influence of the camera shake (image blurring), and therefore the image blurring track 322 is displayed, for example, in green. As shown in FIG. 17B, when the image blurring track 322 protrudes to the outside of the circle display 324, the camera shake (image blurring) is noticeable in the printed photograph. At this level, the image blurring track is displayed, for example, in red. Furthermore, when the track 322 of the image blurring is between FIGS. 17A and 17B as shown in FIG. 17C, the image blurring track 322 is displayed, for example, in yellow.

Figure 17C:

After the images are displayed as shown in FIGS. 17A to 17C described above in the step S103 of FIG. 15, the calculation control section 25 judges whether or not an image changeover switch is in an ON state (step S104). When it is judged in the judgment of the step S104 that the image changeover switch is not in the ON state, the image comparison display is continued. On the other hand, when it is judged that the image changeover switch is in the ON state, the calculation control section 25 judges whether or not the image changeover switch is ON for two seconds or more, that is, whether or not the switch is pressed long (step S105). When it is judged in the judgment of the step S105 that the so-called long pressing is not performed, the image display is switched (step S106).

In the switching of the image display, for example, when the image of FIG. 17A is displayed on the monitor 24, the image of FIG. 17B is displayed. In the image of FIG. 17B, second image data 330 in the case where the camera shake correction is not performed and the second image blurring level corresponding to the image are switched and visually displayed. On the other hand, when the image of FIG. 17B is displayed, the image is switched to that of FIG. 17A. Here, in the display shown in FIG. 17B, the second image data 330, the image blurring track 322 and circle displays 323, 324 described with reference to FIG. 17A are displayed. Here, the image blurring track 322 in FIG. 17B is calculated from the curves 300 and 310.

Every time the image changeover switch (not shown) is turned on/off, the image displays shown in FIGS. 17A and 17B are alternately switched.

Figure 3:
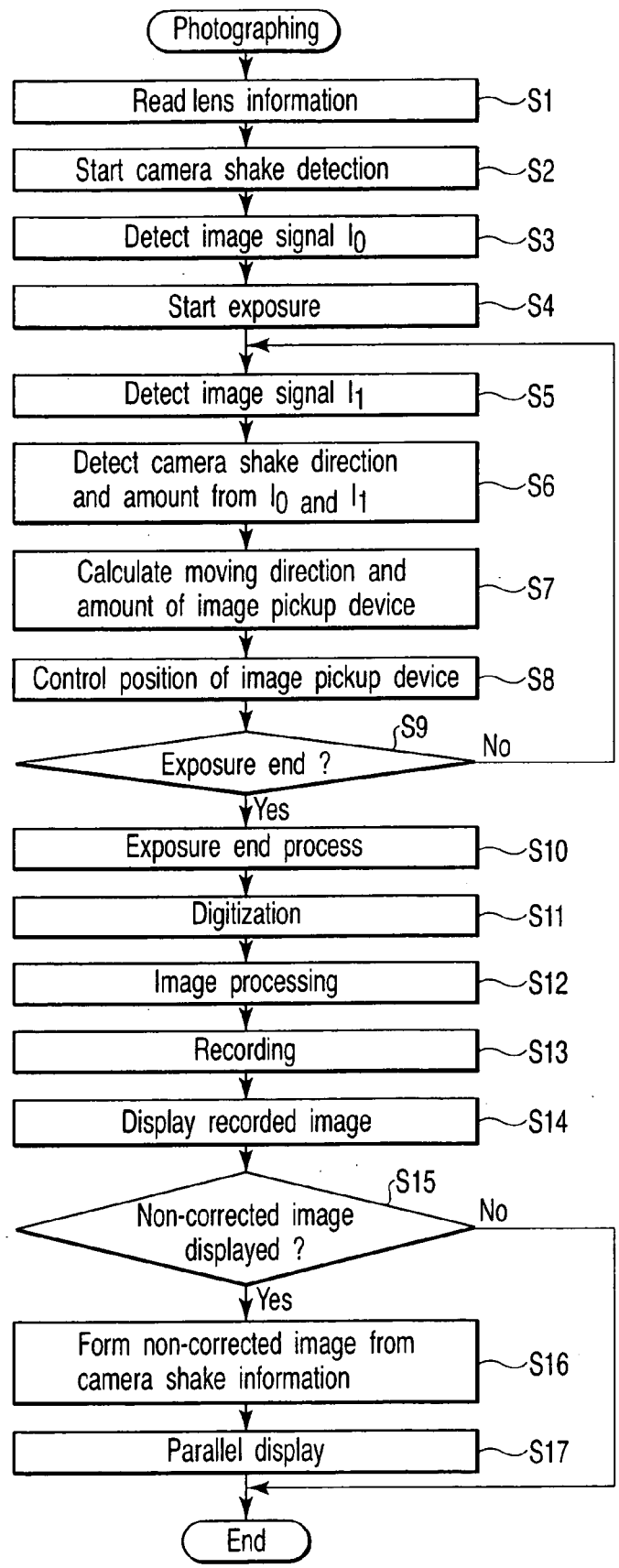
FIG. 3 is a flowchart showing a control at the time of photographing of the camera according to the first embodiment of the present invention.

Moreover, when it is judged in the judgment of the step S105 of FIG. 15 that the image changeover switch is long pressed, the calculation control section 25 records both the first and second image blurring level data into the recording section 15, and the process returns to the flowchart of FIG. 3.

Since the image blurring level data is recorded in the recording section 15 in the second embodiment in this manner, the user can confirm the effect of the camera shake correction on a monitor other than that of the camera after the photographing. For example, when the image blurring level data recorded in the recording section 15 is transferred to a personal computer (PC) or the like, it is possible to confirm the effect of the camera shake correction in detail on the monitor of the PC or the like. When the image blurring level data is transferred to the PC, it is possible to statistically check camera shake states in many images after the photographing. When the user performs this analysis, the user can constantly confirm the state of the camera shake in the user's photographing. For example, a learning effect that the user takes care not to cause the camera shake in the next photographing can be expected when the camera shake is large as a result of the confirmation.

Figure 18:
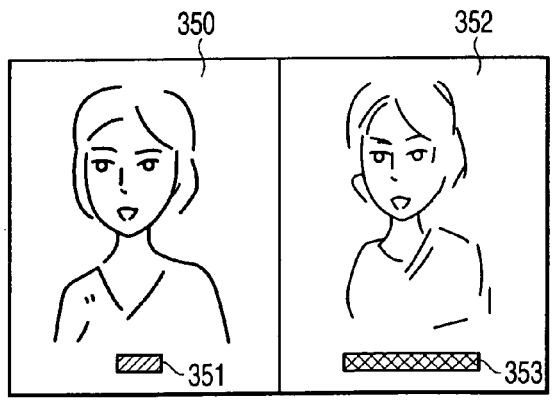
FIG. 18 is a diagram showing a first modification of the display example during the display of the effect of the camera shake correction according to the technique of the second embodiment.

Moreover, as a modification of the display of the image blurring level, a display configuration of the image comparison display of the step S103 may be modified as shown in FIG. 18. In the modification, first image data 350 in a case where the camera shake correction has been performed and second image data 352 in a case where the camera shake correction is not performed are arranged and displayed. A first image blurring level 351 associated with the first image data 350 and a second image blurring level 353 associated with the second image data 352 are displayed in bar displays. In this case, a length of the bar display is associated with the size of the image blurring. Even in this modification, the color of the bar display may be changed in accordance with the size of the image blurring.

Figure 19:
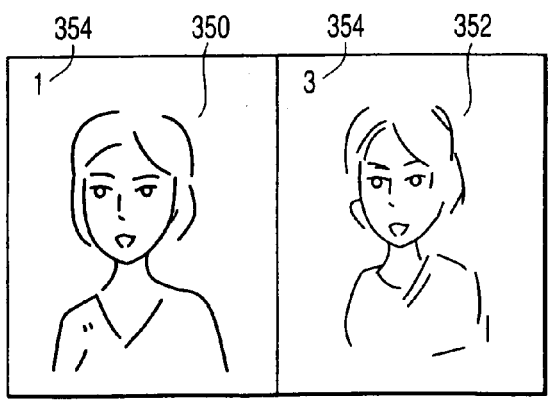
FIG. 19 is a diagram showing a second modification of the display example during the display of the effect of the camera shake correction according to the technique of the second embodiment.

Furthermore, the display configuration of the image comparison display may be modified as shown in FIG. 19. In the modification, first image data 350 in a case where the camera shake correction has been performed and second image data 352 in a case where the camera shake correction is not performed are arranged and displayed. A numeric value corresponding to the size of the image blurring is displayed in a left shoulder portion of a portion in which these image data are displayed. For example, "1" shown by reference numeral 354 indicates a case where the image blurring is smaller than 25 µm, and "3" shown by reference numeral 355 indicates a case where the image blurring is 50 µm or more. Alternatively, a character corresponding to the size of the image blurring may be displayed.

Moreover, when the actuator 21 has a very good tracking property, there is not any fear of tracking delay with respect to the camera shake (image blurring), further the moving range of the actuator 21 is very large, and the camera shake (image blurring) exceeding the moving range of the actuator is not considered, the image blurring level in the case where the camera shake correction has been performed may be regarded as zero. When a well completed camera shake correction mechanism can be realized, the first image blurring level corresponding to the first image data does not have to be displayed on the monitor 24, and only the second image blurring level may be displayed. In this case, the first image blurring level data does not have to be recorded in the step S107 of FIG. 15, and only the second image blurring level data may be recorded.

The present invention has been described based on the embodiments, but the present invention is not limited to the embodiments, and can be, needless to say, modified or applied variously in the scope of the present invention. For example, in the respective embodiments, the example of the application of the technique of the present invention to the digital camera has been described. However, the technique of the present invention is applicable to composite products having camera functions such as a cellular phone provided with a camera function, a personal digital assistant (PDA) provided with a camera function, and a portable computer provided with a camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera comprising:
   an optical photographing system;
   an image pickup device which receives a luminous flux via the optical photographing system to output image data;
   a monitor on which an image is displayed based on the image data obtained by the image pickup device;
   a camera shake correcting section which controls a position of the image pickup device or processes the image data from the image pickup device to obtain first image data in which an influence of camera shake is reduced;
   a camera shake detecting section which detects a camera shake state of the camera;
   a processing/forming section which forms the second image data at the time of non-operation of the camera shake correcting section based on the first image data which is obtained by operation of the camera shake correcting section and in which the influence of the camera shake is reduced, and the camera shake state detected by the camera shake detecting section; and
   a monitor control section which executes a control in such a manner that the first image data in which the influence of the camera shake is reduced and the second image data at the time of the non-operation of the camera shake correcting section are displayed on the monitor.

2. The camera according to claim 1, wherein the camera shake detecting section is a vibration detection sensor which detects a vibration state of the camera.

3. The camera according to claim 2, wherein the vibration detection sensor is an angular speed sensor or an acceleration sensor.

4. The camera according to claim 1, wherein the camera shake state is detected by the camera shake detecting section based on the image data obtained from the image pickup device.

5. The camera according to claim 4, wherein the image data obtained from the image pickup device is at least two or more image data obtained by the image pickup device in different timings.

6. The camera according to claim 1, wherein the monitor control section executes a control in such a manner that the first image data in which the influence of the camera shake is reduced and the second image data at the time of the non-operation of the camera shake correcting section are simultaneously displayed on the monitor.

7. The camera according to claim 1, wherein the monitor control section executes a control in such a maimer that the first image data in which the influence of the camera shake is reduced is displayed in a first region on the monitor and the second image data at the time of the non-operation of the camera shake correcting section is displayed in a second region which is different from the first region on the monitor.

8. The camera according to claim 1, wherein the monitor control section executes a control in such a manner that the first image data in which the influence of the camera shake is reduced and the second image data at the time of the non-operation of the camera shake correcting section are switched to display either of the image data on the monitor.

9. A camera comprising:
an optical photographing system;
an image pickup device which receives a luminous flux via the optical photographing system to output image data;
an optical finder via which a subject to be photographed is observed;
a monitor on which an image is displayed based on the image data obtained by the image pickup device;
a camera shake correcting section which controls a position of the image pickup device or processes the image data from the image pickup device to obtain first image data in which an influence of camera shake is reduced;
a camera shake detecting section which detects a camera shake state of the camera;
a processing/forming section which forms the second image data at the time of non-operation of the camera shake correcting section based on the first image data which is obtained by operation of the camera shake correcting section and in which the influence of the camera shake is reduced, and the camera shake state detected by the camera shake detecting section; and
a monitor control section which executes a control in such a manner that the first image data in which the influence of the camera shake is reduced and the second image data at the time of the non-operation of the camera shake correcting section are both displayed on the monitor.

10. The camera according to claim 9, further comprising: a movable mirror mechanism which is disposed in a light path between the optical photographing system and the image pickup device and which is constituted to guide the luminous flux that has received via the optical photographing system to the optical finder at a usual time and to retreat from the light path and guide the luminous flux that has received via the optical photographing system to the image pickup device at the time of photographing.

11. The camera according to claim 9, wherein the optical finder is disposed on a light path separate from that of the optical photographing system.

12. A camera comprising:
an optical photographing system;
an image pickup device which receives a luminous flux via the optical photographing system to output image data;
a recording section in which the image data obtained by the image pickup device is recorded;
a camera shake correcting section which controls a position of the image pickup device or processes the image data from the image pickup device to obtain first image data in which an influence of camera shake is reduced;
a camera shake detecting section which detects a camera shake state of the camera;
a processing/forming section which forms second image data at the time of non-operation of the camera shake correcting section based on the first image data which is obtained by operation of the camera shake correcting section and in which the influence of the camera shake is reduced, and the camera shake state detected by the camera shake detecting section; and
a recording control section which executes a control in such a manner that the first image data in which the influence of the camera shake is reduced and the second image data at the time of the non-operation of the camera shake correcting section are recorded in the recording section.

13. A camera comprising:
an optical photographing system;
an image pickup device which receives a luminous flux via the optical photographing system to output image data;
a monitor on which an image is displayed based on the image data obtained by the image pickup device;
a camera shake correcting section which controls a position of the image pickup device or processes the image data from the image pickup device to obtain first image data in which an influence of camera shake is reduced;
a camera shake detecting section which detects a camera shake state of the camera;
a processing/forming section which forms second image data to be obtained at the time of non-operation of the camera shake correcting section based on the first image data and the camera shake state detected by the camera shake detecting section;
a blurring level production section which produces first image blurring level data indicating an amount of image blurring corresponding to the first image data obtained at the time of operation of the camera shake correcting section, and second image blurring level data indicating an amount as amount of image blurring corresponding to the second image data obtained at the time of non-operation of the camera shake correcting section; and
a monitor control section which executes a control in such a manner that the first image data is associated with the first image blurring level data to display an image on the monitor and that the second image data is associated with the second image blurring level data to display an image on the monitor.

14. A camera comprising:
an optical photographing system;
an image pickup device which receives a luminous flux via the optical photographing system to output image data;
a monitor on which an image is displayed based on the image data obtained by the image pickup device;
a finder via which a subject to be photographed is observed;

a camera shake correcting section which controls a position of the image pickup device or processes the image data from the image pickup device to obtain first image data in which an influence of camera shake is reduced;

a camera shake detecting section which detects a camera shake state of the camera;

a processing/forming section to process/form second image data to be obtained at the time of non-operation of the camera shake correcting section based on the first image data and the camera shake state detected by the camera shake detecting section;

a blurring level production section which produces first image blurring level data indicating an amount a of image blurring corresponding to the first image data obtained at the time of operation of the camera shake correcting section, and second image blurring level data indicating an amount of image blurring corresponding to the second image data obtained at the time of non-operation of the camera shake correcting section; and a monitor control section which executes a control in such a manner that the first image data is associated with the first image blurring level data to display an image on the monitor and that the second image data is associated with the second image blurring level data to display an image on the monitor.

15. A camera comprising:

an optical photographing system;

an image pickup device which receives a luminous flux via the optical photographing system to output image data;

a monitor on which an image is displayed based on the image data obtained by the image pickup device;

a camera shake correcting section which controls a position of the image pickup device or processes the image data from the image pickup device to obtain anti-shake image data in which an influence of camera shake is reduced;

a camera shake detecting section which detects a camera shake state of the camera;

a blurring level production section which produces image blurring level data indicating an amount of image blurring of the anti-shake image data produced at the time of operation of the camera shake correcting section, and image blurring level data indicating an amount of image blurring of the image data produced at the time of non-operation of the camera shake correcting section, respectively; and a monitor control section which executes a control in such a manner that the image blurring level data of the anti-shake image data produced at the time of the operation of the camera shake correcting section and the image blurring level data of the image data produced at the time of the non-operation of the camera shake correcting section are displayed on the monitor.

16. A camera comprising:

an optical photographing system;

an image pickup device which receives a luminous flux via the optical photographing system to output image data;

a recording section in which the image data obtained by the image pickup device is recorded;

a camera shake correcting section which controls a position of the image pickup device or processes the image data from the image pickup device to obtain anti-shake image data in which an influence of camera shake is reduced;

a camera shake detecting section which detects a camera shake state of the camera;

a blurring level production section which produces image blurring level data indicating an amount of image blurring of the anti-shake image data produced at the time of operation of the camera shake correcting section, and image blurring level data indicating an amount of image blurring of the image data produced at the time of non-operation of the camera shake correcting section, respectively; and a recording control section which executes a control in such a manner that the image blurring level data of the anti-shake image data produced at the time of the operation of the camera shake correcting section and the image blurring level data of the image data produced at the time of the non-operation of the camera shake correcting section are further recorded in the recording section.

17. The camera according to claim 13, wherein the camera shake detecting section is a vibration detection sensor which detects a vibration state of the camera.

18. The camera according to claim 17, wherein the vibration detection sensor is an angular speed sensor or an acceleration sensor.

19. The camera according to claim 13, wherein the camera shake state is detected by the camera shake detecting section based on the image data obtained from the image pickup device.

20. The camera according to claim 19, wherein the image data obtained from the image pickup device is at least two or more image data obtained by the image pickup device in different timings.

21. The camera according to claim 13, wherein the image is displayed based on the image blurring level data by the monitor control section in an analog display in accordance with a size of the image blurring level data.

22. The camera according to claim 21, wherein the analog display in accordance with the size of the image blurring level data is a display in accordance with a track of blurring of the image data.

23. The camera according to claim 21, wherein the image is displayed based on the image blurring level data by the monitor control section in representation of a size of the image blurring level data by character display.

24. A camera comprising:

an image pickup means for receiving a luminous flux via an optical photographing system to output image data;

a monitor means for displaying an image based on the image data obtained by the image pickup means;

a camera shake correcting means for controlling a position of the image pickup means or processing the image data from the image pickup means to obtain first image data in which an influence of camera shake is reduced;

a camera shake detecting means for detecting a camera shake state of the camera;

a processing/forming means for forming the second image data at the time of non-operation of the camera shake correcting means based on the first image data which is obtained by operation of the camera shake correcting means and in which the influence of the camera shake is reduced, and the camera shake state detected by the camera shake detecting means; and a monitor control means for executing a control in such a maimer that the first image data in which the influence of the camera shake is reduced and the second image data at the time of the non-operation of the camera shake correcting section are displayed on the monitor means.

25. A camera comprising:

an image pickup means for receiving a luminous flux via an optical photographing system to output image data;

a monitor means for displaying an image based on the image data obtained by the image pickup means;

a camera shake correcting means for controlling a position of the image pickup means or processing the image data from the image pickup means to obtain first image data in which an influence of camera shake is reduced;

a camera shake detecting means for detecting a camera shake state of the camera;

a processing/forming means for forming second image data to be obtained at the time of non-operation of the camera shake correcting means based on the first image data and the camera shake state detected by the camera shake detecting means;

a blurring level production means for producing first image blurring level data indicating an amount of image blurring corresponding to the first image data obtained at the time of operation of the camera shake correcting means, and second image blurring level data indicating an amount as of image blurring corresponding to the second image data obtained at the time of non-operation of the camera shake correcting means; and a monitor control means for executing a control in such a mariner that the first image data is associated with the first image blurring level data to display an image on the monitor means and that the second image data is associated with the second image blurring level data to display an image on the monitor means.

26. A method of displaying an image of a camera comprising:

starting exposure;

detecting camera shake during the exposure;

controlling a position of an image pickup device based on camera shake information obtained by the detection to correct the camera shake to obtain first image data;

ending the exposure;

producing second image data at non-camera shake correction based on the first image data after the end of the exposure and the camera shake information obtained by the detection; and displaying the first image data and the second image data.

27. The method according to claim 26, wherein the act of displaying displays the first image data and the second image data simultaneously.

28. A method of displaying an image of a camera comprising:

performing a plurality of exposures to obtain a plurality of image data;

detecting camera shake in each of the plurality of exposures;

controlling the camera shake based on camera shake information obtained by the detection;

producing image data at non-camera shake correction based on image data at the plurality of camera shake corrections obtained from an image pickup device after the end of the exposures and the plurality of pieces of camera shake information obtained by the plurality of detections; and displaying the image data at the non-camera shake correction.

29. A method of displaying an image of a camera comprising:

performing a plurality of exposures to obtain a plurality of image data;

detecting camera shake in each of the plurality of exposures;

controlling a position of an image pickup device based on camera shake information obtained by the detection to correct the camera shake;

producing image data at non-camera shake correction based on image data at the plurality of camera shake corrections obtained from the image pickup device after the end of the exposures and the plurality of pieces of camera shake information obtained by the plurality of detections; and simultaneously displaying the image data at the camera shake correction and the image data at the non-camera shake correction.

30. A camera comprising:

an image pickup device which receives a luminous flax via an optical photographing element to output image data;

a monitor on which an image is displayed based on the image data;

a camera shake detection sensor which detects a camera shake;

a camera shake correcting section which controls a position of the image pickup device based on the camera shake to obtain anti-shake image data in which an influence of camera shake is reduced;

an image processor which forms blurring image data, by processing the anti-shake image data, to visualize effect of an operation of the camera shake correcting section;

a monitor controller which controls in such a manner that the anti-shake image data and the blurring image data are displayed on the monitor.

31. The camera according to claim 30, wherein the monitor controller controls in such a manner that the anti-shake image data and the blurring image data are simultaneously displayed on the monitor.

32. The camera according to claim 31, wherein the monitor controller controls in such a manner that a display region corresponding to the anti-shake image data and a display region corresponding to the blurring image data are arranged adjacent to each other.

33. The camera according to claim 30, wherein the monitor controller controls in such a manner that the anti-shake image data and the blurring image data are switched to display either of the image data on the, monitor.

34. A method of displaying an image of camera, comprising:

executing exposure;

detecting camera shake during the exposure;

correcting the camera shake to obtain anti-shake image data in which an influence of camera shake is reduced;

forming blurring image data, by processing the anti-shake image data, to visualize effect of the correcting;

displaying the anti-shake image data and the blurring image data.

35. The method according to claim 34, wherein said correcting is performed by controlling a position of an image pickup device based on the camera shake.

* * * * *